United States Patent
Chi et al.

(10) Patent No.: US 9,442,536 B1
(45) Date of Patent: Sep. 13, 2016

(54) COMPUTER CASE

(71) Applicant: COOLER MASTER TECHNOLOGY INC., New Taipei (TW)

(72) Inventors: Chia-Hsiang Chi, New Taipei (TW); Yu-Qing Lyu, New Taipei (TW)

(73) Assignee: COOL MASTER TECHNOLOGY INC., New Taipei (TW)

( * ) Notice: Subject to any disclaimer, the term of this patent is extended or adjusted under 35 U.S.C. 154(b) by 0 days.

(21) Appl. No.: 14/810,091

(22) Filed: Jul. 27, 2015

(30) Foreign Application Priority Data

Jun. 1, 2015 (TW) ............................. 104208631 U

(51) Int. Cl.
*H05K 5/00* (2006.01)
*G06F 1/18* (2006.01)

(52) U.S. Cl.
CPC ..................... *G06F 1/181* (2013.01)

(58) Field of Classification Search
CPC ................................. H05K 5/00; G06F 1/181
USPC ........ 312/223.2, 265.5, 265.6; 361/683, 695, 361/724
See application file for complete search history.

(56) References Cited

U.S. PATENT DOCUMENTS

| | | | | |
|---|---|---|---|---|
| 1,724,882 A * | 8/1929 | Meyercord | ............ | F25D 23/066 220/4.02 |
| 5,031,070 A * | 7/1991 | Hsu | ............ | G06F 1/18 220/690 |
| 5,165,770 A * | 11/1992 | Hahn | ............ | A47B 47/05 211/26 |
| 5,685,623 A * | 11/1997 | Katz | ............ | D06F 39/12 312/263 |
| 5,825,626 A * | 10/1998 | Hulick | ............ | G06F 1/181 220/326 |
| 5,845,977 A * | 12/1998 | Neukam | ............ | G06F 1/181 312/108 |
| 5,931,550 A * | 8/1999 | Chen | ............ | G06F 1/181 312/223.2 |
| 5,975,659 A * | 11/1999 | Yang | ............ | G06F 1/181 312/223.2 |
| 6,109,710 A * | 8/2000 | Wu | ............ | G06F 1/181 312/223.2 |
| 6,158,794 A * | 12/2000 | Flanagan | ............ | B60H 1/00514 296/24.35 |
| 6,297,948 B1 * | 10/2001 | Buican | ............ | G06F 1/181 206/320 |
| 6,381,145 B1 * | 4/2002 | Chen | ............ | G06F 1/181 312/223.2 |
| 6,469,904 B1 * | 10/2002 | Vigeant | ............ | G06F 1/181 174/378 |
| 6,671,179 B2 * | 12/2003 | Chen | ............ | G06F 1/181 190/116 |
| 7,095,609 B2 * | 8/2006 | Erickson | ............ | G06F 1/181 312/223.2 |
| 7,315,457 B1 * | 1/2008 | Chen | ............ | G06F 1/184 312/223.2 |
| 2002/0167790 A1 * | 11/2002 | Gan | ............ | G06F 1/181 361/679.58 |
| 2005/0140256 A1 * | 6/2005 | Wang | ............ | A47B 88/0014 312/265.5 |
| 2007/0001560 A1 * | 1/2007 | Chen | ............ | G06F 1/183 312/223.2 |
| 2008/0225475 A1 * | 9/2008 | Zhang | ............ | G06F 1/181 361/726 |
| 2010/0244639 A1 * | 9/2010 | Chen | ............ | G06F 1/181 312/223.2 |
| 2014/0097729 A1 * | 4/2014 | Kuo | ............ | G06F 1/18 312/223.2 |

FOREIGN PATENT DOCUMENTS

DE 10251820 * 7/2003

* cited by examiner

*Primary Examiner* — Janet M Wilkens
(74) *Attorney, Agent, or Firm* — Chun-Ming Shih; HDLS IPR Services

(57) ABSTRACT

A computer case includes a chassis and at least one side plate. The chassis includes a base plate, an upper frame corresponding to the base plate, and two side frames connected to the base plate and the upper frame. Each of the side frames forms an opening. The base plate includes a hook portion bent inwardly adjacent to one side of the opening. At least one side plate is assembled to one of the two side frames and covers the opening. The at least one side plate includes a clasp member disposed protrudingly. The clasp member is movable with respect to the hook portion and engages with the hook portion, thereby allowing the other end of the at least one side plate, opposite to the clasp member, to open to form an open angle with respect to the upper frame.

18 Claims, 8 Drawing Sheets

COMPUTER CASE

TECHNICAL FIELD

The present invention relates a computer case and, in particular, to a computer case which prevents a side wall or a computer casing from falling off or detaching.

BACKGROUND

There are a variety of conventional computer casings available in the market. For maintenance purposes, the conventional computer casings are usually easily detachable. Taking an upright computer host as an example, the computer casing is a cuboid box structure formed by assembling a main frame and two side plates. Two openings are formed at two sides of the main frame. An inner side edge of each of the side plates is provided with a plurality of hooks. An inner side edge at the other side of each of the side plates is provided with a plurality of slots. When each side plate is fastened to the slots of the main frame, first the hooks of each side plate are engaged with the respective slots of the main frame, and then screws are screwed from the slots of each side plate into screw holes of the main frame, so that each side plate is secured onto the main frame to cover and close each opening.

When a user or a maintenance staff is conducting maintenance/replacement, at least one side plate has to be detached from the main frame. When each of the hooks of the side plate is disengaged from the slot of the main frame, the side plate easily falls off or detaches from the main frame, which causes inconvenience in management and assembly. Especially, when the user or the maintenance staff only needs to replace a memory card, a hard disk, or other components, it is inconvenient and time-consuming to assemble the detached or fallen side plate.

Accordingly, to overcome the above-mentioned shortcomings, the present invention achieves improvement to facilitate easy maintenance replacement of the computer components.

SUMMARY

It is an object of the present invention to provide a computer case which prevents a side plate and a computer casing from falling off or detaching and enables easy assembly or disassembly.

It is another object of the present invention to provide a computer case which enables more convenient and efficient assembly.

Accordingly, the present invention provides a computer case which includes a chassis and at least one side plate. The chassis includes a base plate, an upper frame opposite to the base plate, and two side frames connected to the base plate and the upper frame. Each of the side frames has an opening. The base plate includes a hook portion bent inwardly adjacent to one side of the opening. At least one side plate is assembled to one of the two side frames and covers the opening. The at least one side plate includes a clasp member disposed protrudingly. The clasp member is movable with respect to the hook portion and engages with the hook portion, thereby allowing the other end of the at least one side plate, opposite to the clasp member, to open to form an open angle with respect to the upper frame.

In another view point, the present invention further provides a computer case which comprises a chassis and at least one side plate. The chassis includes a base plate, an upper frame opposite to the base plate, and two side frames connected to the base plate and the upper frame. Each of the side frames has an opening. The base plate includes a hook plate bent inwardly adjacent to one side of the opening, and a fastening portion is disposed on the hook plate. The side plate is assembled to one of the two side frames and covers the opening. The at least one side plate includes a guiding plate disposed protrudingly and a clasp member extending from an edge of the guiding plate. The clasp member is movable a guiding distance along the hook plate for engagement with the fastening portion, thereby allowing the other end of the at least one side plate, opposite to the clasp member, to open to form an open angle with respect to the upper frame.

BRIEF DESCRIPTION OF THE DRAWINGS

The disclosure will become more fully understood from the detailed description and the drawings given herein below for illustration only, and thus does not limit the disclosure, wherein.

DETAILED DESCRIPTION

Detailed descriptions and technical contents of the present invention are illustrated below in conjunction with the accompany drawings. However, it is to be understood that the descriptions and the accompany drawings disclosed herein are merely illustrative and exemplary and not intended to limit the scope of the present invention.

Referring to FIGS. 1 to 4, the present invention provides a computer case which comprises a chassis 100 and at least one side plate 200. In the present embodiment, there are preferably two side plates 200 secured to the chassis 100 to form a cuboid computer host. However, as an example for ease of discussion, only one side plate 200 and the chassis 100 are discussed below to explain assembly/disassembly therebetween. Furthermore, the computer discussed herein includes but is not limited to a desktop computer.

Figure 1:
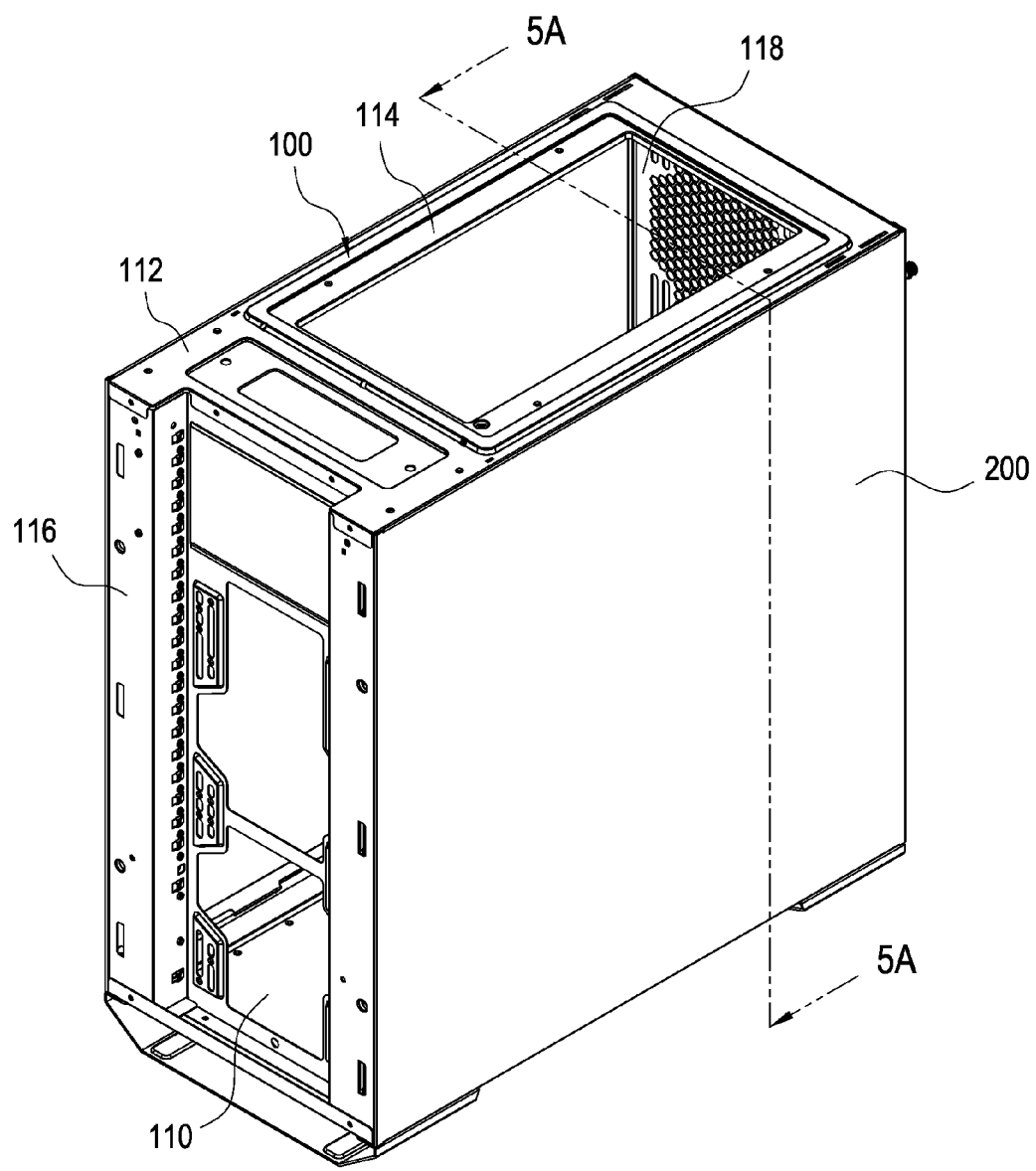
FIG. 1 is a perspective view of a computer case of the present invention.
Figure 2:
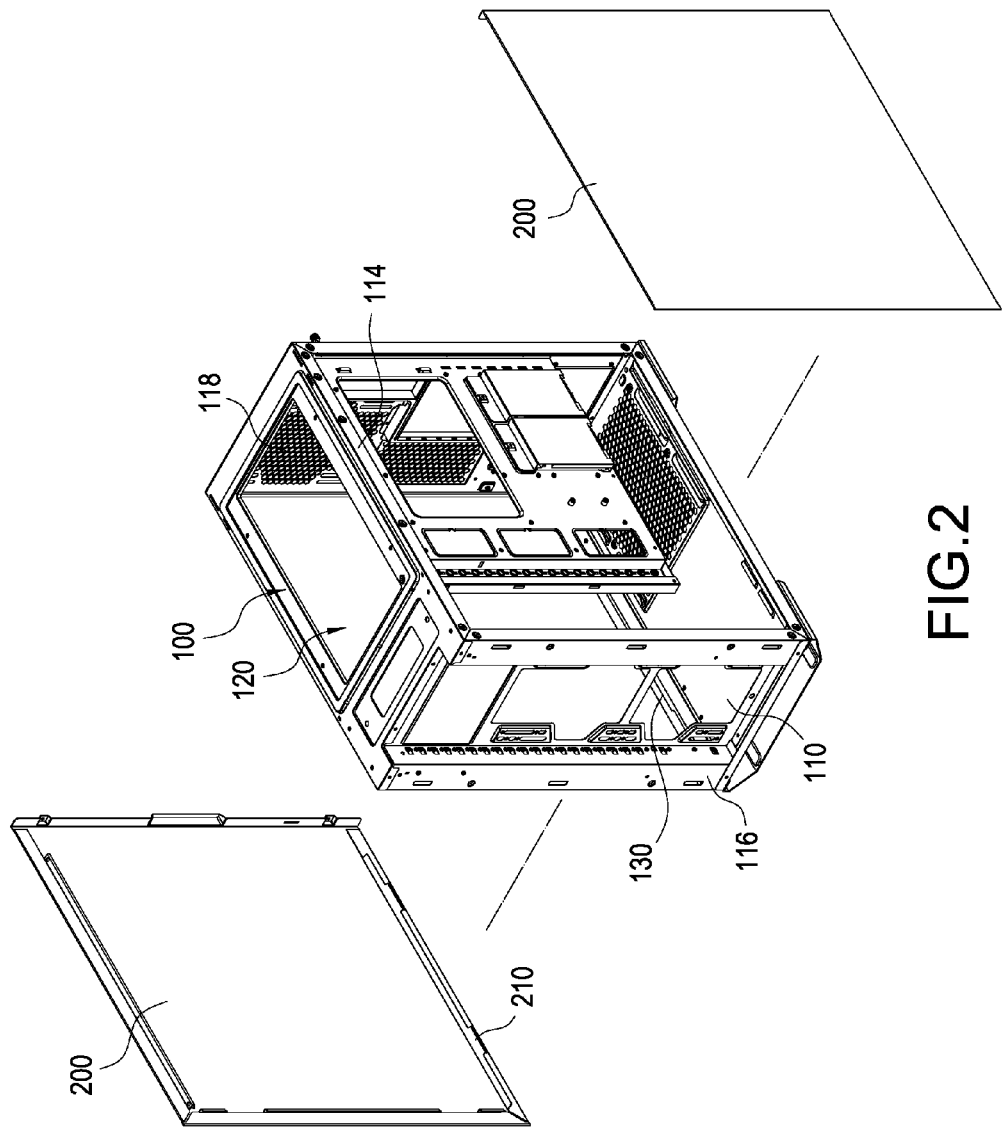
FIG. 2 is an exploded view of the present invention, illustrating two side plates detached from the chassis.
Figure 3:
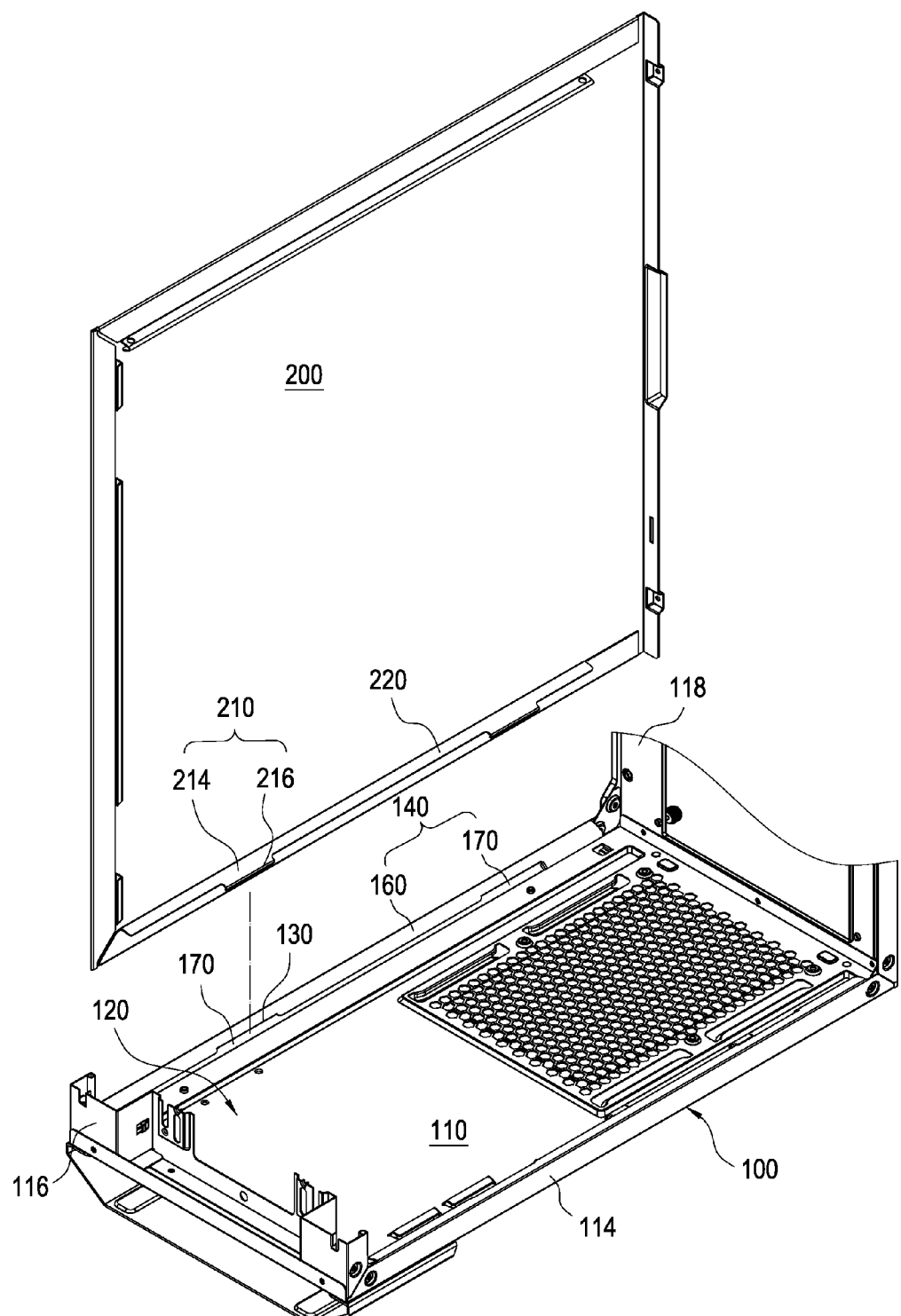
FIG. 3 is an exploded view of the present invention, illustrating one side plate and a portion of the chassis.
Figure 4:
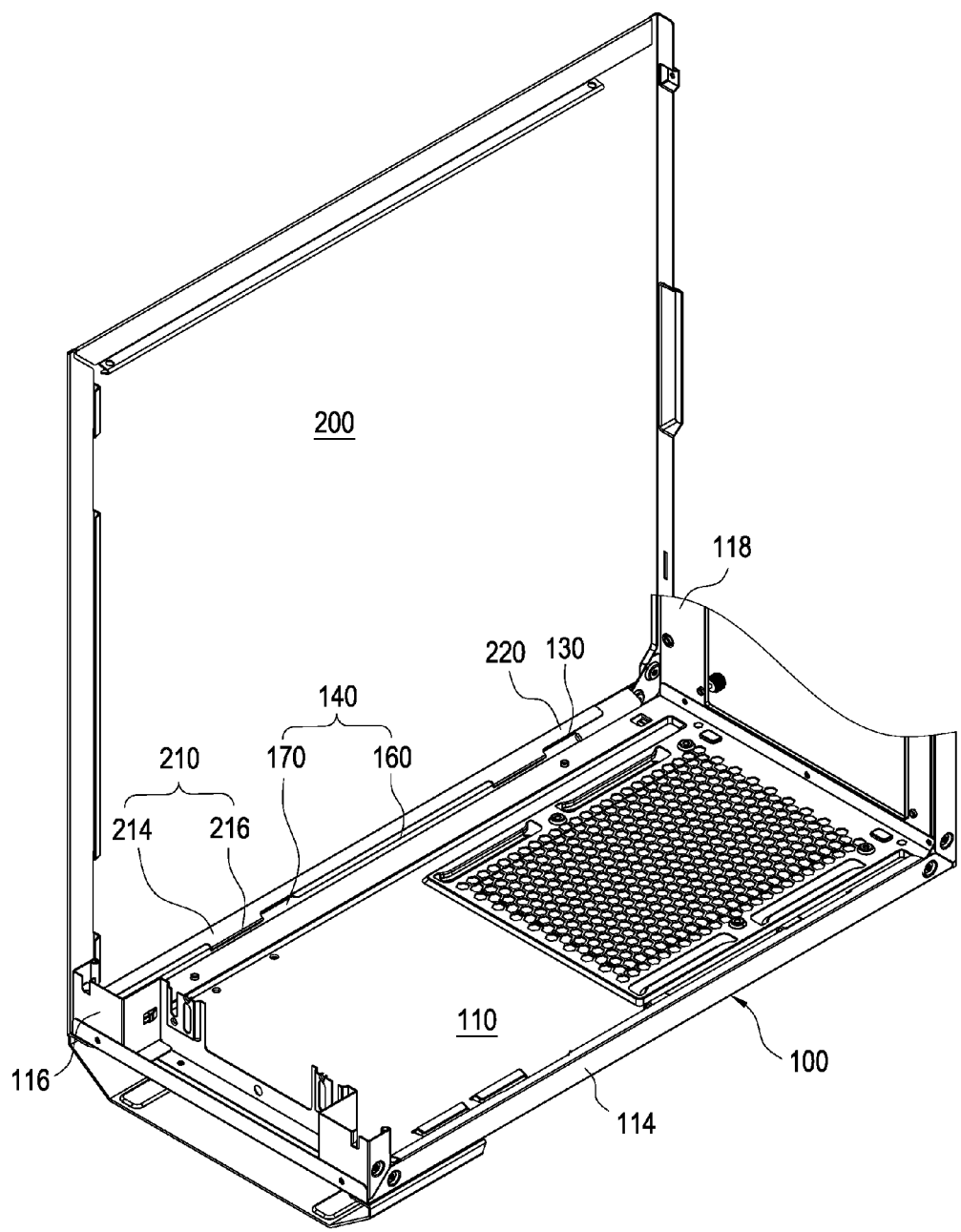
FIG. 4 is a perspective assembly view of the present invention, illustrating one side plate and a portion of the chassis.

Referring to FIGS. 2 to 4, the chassis 100 includes a base plate 110, an upper frame 112 opposite to the base plate 110, and two side frames 114 connected to the base plate 110 and the upper frame 112. Each of the side frames 114 forms an opening 120, the base plate 110 includes a hook portion 130 bent inwardly adjacent to one side of the opening 120. At least one side plate 200 is assembled to one of the two side frames 114 and covers the opening 120. The at least one side plate 200 includes a clasp member 210 disposed protrudingly, the clasp member 210 is movable with respect to the hook portion 130 and engages with the hook portion 130, thereby allowing the other end of the at least one side plate 200, opposite to the clasp member 210, to open to form an open angle θ with respect to the upper frame 112.

Figures 5A, 5B:
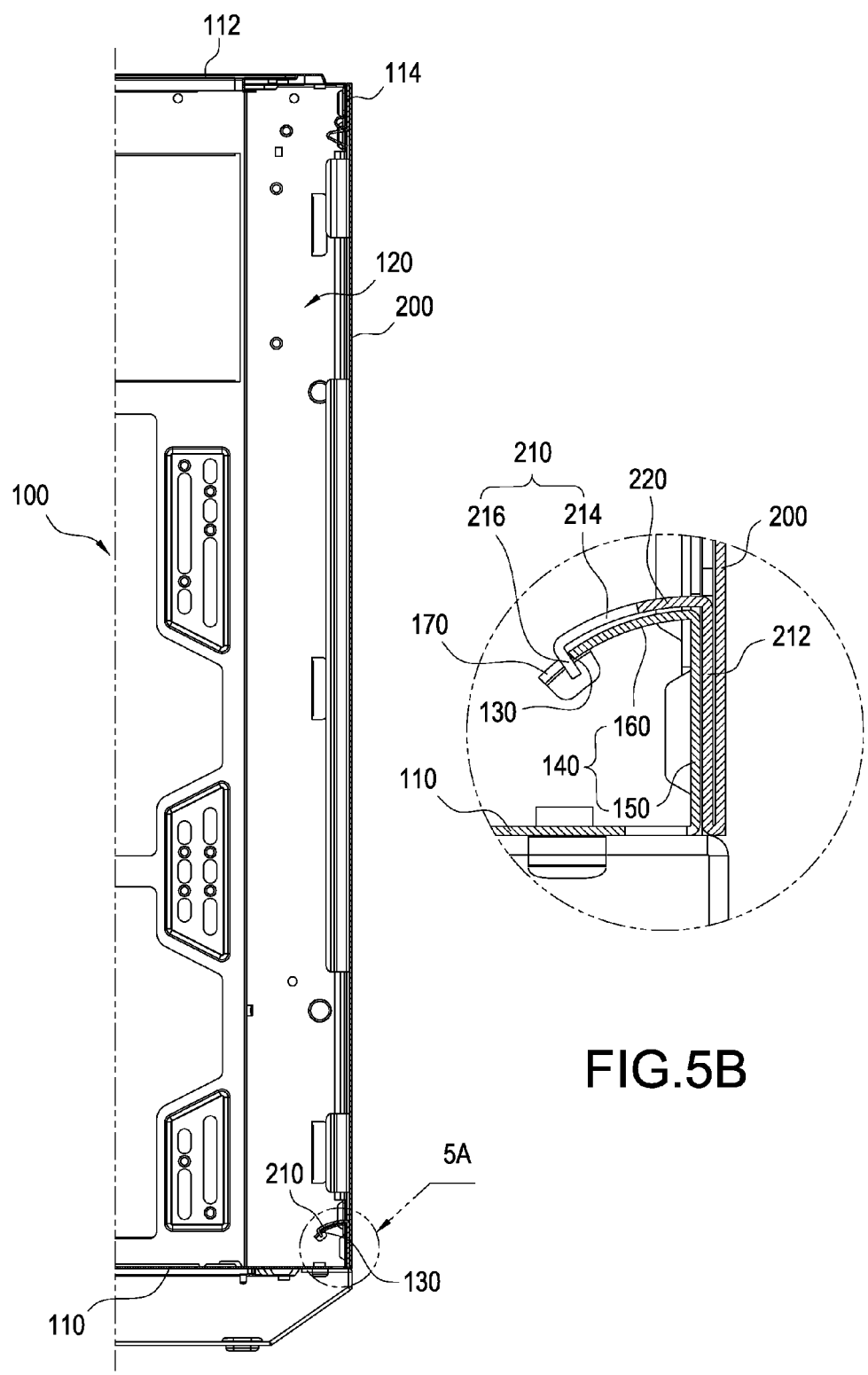
FIG. 5A is a cross-sectional view of FIG. 1.
FIG. 5B is a partial enlarged view of FIG. 5A.

Referring to FIGS. 4, 5A and 5B, a guiding plate 220 is extended from an edge of the side plate 200 and is correspondingly disposed along an edge of the side frame 114, the clasp member 210 protrudes outwardly from an edge of the guiding plate 220, the base plate 110 includes a hook plate 140 disposed corresponding to the guiding plate 220 and a recess 170 formed on the hook plate 140, and the fastening portion 130 is adjacent to the recess 170. Referring to FIG. 4, the fastening portion 130 bent from the base plate 110 is disposed on the recess 170 of the hook plate 140. In other words, the hook plate 140 protrudes further than the fastening portion 130.

The clasp member 210 further includes a first extension section 214 and a hook section 216 bent from the first extension section 214. The hook plate 140 includes an upright section 150 bent from the base plate 110 and a second extension section 160 connected to the upright section 150. In the embodiment shown in FIG. 5B, the side plate 200 further includes an overlapping section 212 bent from and parallel to the side plate 200, and the guiding plate 220 protrudes outwardly from the overlapping section 212. The first extension section 214 is corresponding to the second extension section 160 in shape, and, preferably, the first extension section 214 and the second extension section 160 are in a curved shape.

When the side plate 200 is assembled to one of the side frames 114 and covers the opening 120, the hook section 216 of the clasp member 210 is engaged with the second extension section 160, thereby preventing the side plate 200 from detaching and opening to form the open angle θ. In other words, the first extension section 214 of the clasp member 210 and the second extension section 160 of the hook plate 140 are close in length, so that the side plate 200 can be secured to the side frame 114 of the chassis 100.

Furthermore, as shown in FIG. 4, it is preferable that the guiding plate 220 includes two clasp members 210, and the hook plate 140 includes two fastening portions 130 for engagement with the clasp members 210. The number and the arrangement of the clasp member 210 and the fastening portion 130 vary depending on the size of the chassis 100 or actual demands, and the present invention is not limited thereto.

Figure 6:
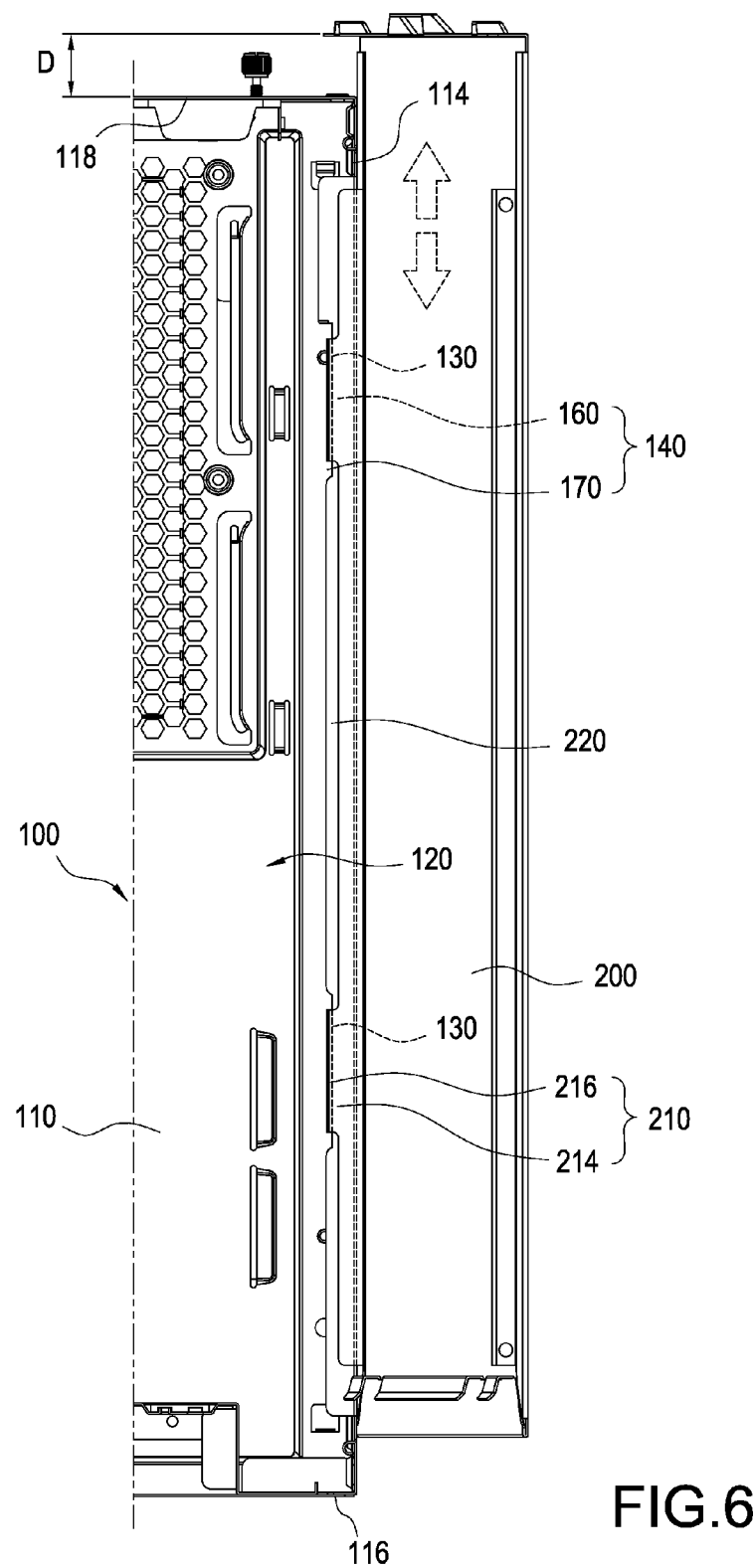
FIG. 6 is a partial top view of the present invention, illustrating the side plate moving a guiding distance with respect to the chassis.

Referring to FIG. 6, when the side plate 200 is moved forcing the clasp member 210 moving along the hook plate 140 to the recess 170, the hook section 216 of the clasp member 210 is movably engaged with the fastening portion 130. Meanwhile, the hook section 216 moves from the second extension section 160 of the hook plate 140 to the fastening portion 130, so that the open angle θ would be formed between the side plate 200 and the side frame 114. The open angle θ is formed by a moving distance between an outer edge of the second extension section 160 and the fastening portion 130. The magnitude of the open angle θ varies depending on the aforesaid distance, so can be changed as required, and thus the present invention is not limited to the magnitude of the open angle θ.

Figures 7A, 7B:
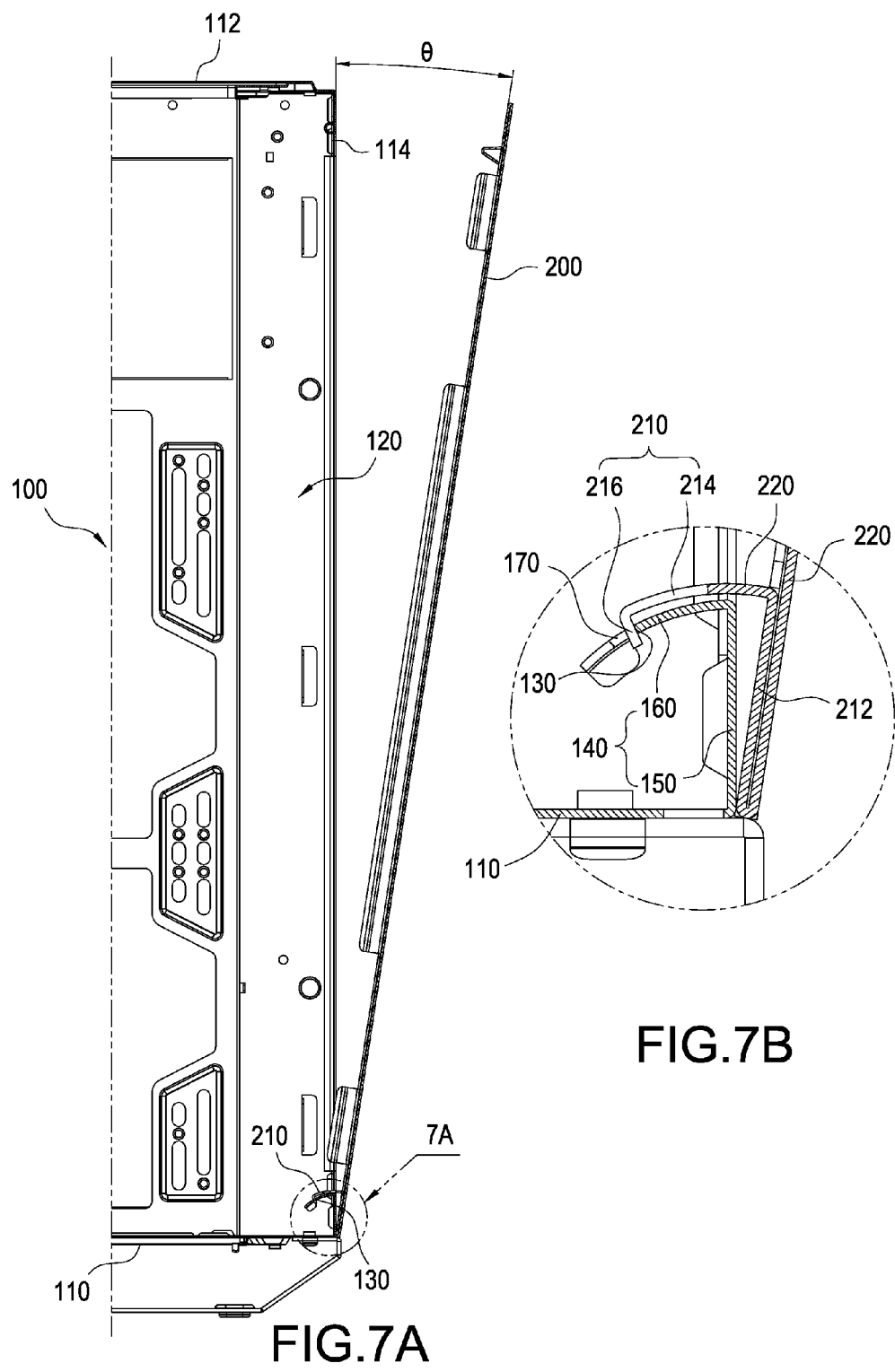
FIG. 7A is a partial side view of the present invention, illustrating the side plate opened to form an open angle.
FIG. 7B is a partial enlarged view of FIG. 7A.

Referring to FIGS. 6, 7A and 7B, the present invention further provides a computer case which includes a chassis 100 and at least one side plate 200. The present embodiment is the same to the foregoing embodiment in structure and relationship between components, and is different from the foregoing embodiment in the operation. The details are provided hereinafter.

In the present embodiment, the chassis 100 includes a base plate 110, an upper frame 112 opposite to the base plate 110, and two side frames 114 connected to the base plate 110 and the upper frame 112. Each of the side frames 114 forms an opening 120. The base plate 110 includes a hook plate 140 bent inwardly adjacent to one side of the opening 120, and a fastening portion 130 is disposed on the hook plate 140. The side plate 200 is assembled to one of the two side frames 114 and covers the opening 120, and the side plate 200 includes a guiding plate 220 disposed protrudingly and a clasp member 210 extending from an edge of the guiding plate 220. The clasp member 210 is movable a guiding distance D along the hook plate 140 for engagement with the fastening portion 130, thereby allowing the other end of the at least one side plate 200, opposite to the clasp member 210, to open to form an open angle θ with respect to the upper frame 112.

Referring to FIG. 6, the chassis 100 further includes a front plate 116 and a rear frame 118 opposite to the front plate 116. The guiding distance D herein is a moving distance during the operation of detaching the side plate 200 from the chassis 100 or the operation of assembling the side plate 200 back to the chassis 100. When the side plate 200 moves the guiding distance D from the front plate 116 to the rear frame 118, the clasp member 210 is engaged with the fastening portion 130, thereby allowing the side plate 200 to open to form the open angle θ, as shown in FIGS. 7A and 7B. In some embodiments, the side frames 114 are assembled by the front plate 116, the rear frame 118 and the upper frame 112.

Furthermore, the hook section 216 is moved from the second extension section 160 of the hook plate 140 to the fastening portion 130, so that the side plate 200 forms an open angle θ with respect to the side frame 114. When necessary, a user or a maintenance staff can conduct maintenance by using the open angle θ, and thereby the side plate 200 and the computer casing 100 are prevented from falling off or detaching to cause inconvenience.

Referring to FIG. 6, when the side plate 200 moves a guiding distance D from the rear frame 118 to the front plate 116, the clasp member 210 is disengaged from the fastening portion 130 (i.e. leaving the recess 170) and moved along the hook plate 140. Meanwhile, the hook section 216 of the clasp member 210 is engaged with the second extension section 160 to cover the opening 120, thereby preventing the side plate 200 from opening to form the open angle θ.

Figure 8:
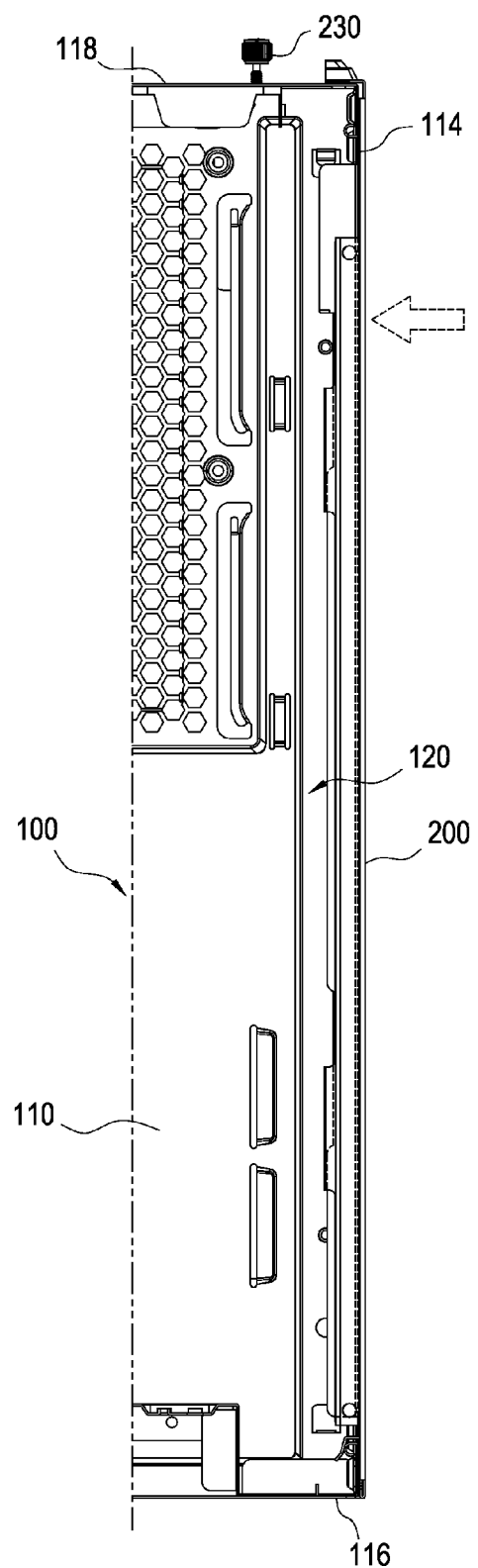
FIG. 8 is a partial top view of the present invention, illustrating the side plate secured to the chassis.

Referring to FIG. 8, when the side plate 200 is assembled back to and secured to the side frame 114 of the chassis 100, the side plate 200 can be secured onto the rear frame 118 by screw fastening using a screw 230 or other suitable components. Therefore, the side plate 200 can be readily assembled to the chassis 100, which enables more convenient and efficient assembly. Other structural descriptions of the present invention are discussed in the foregoing embodiment, so are omitted herein for brevity.

It is to be understood that the above descriptions are merely the preferable embodiments of the present invention and are not intended to limit the scope of the present invention. Equivalent changes and modifications made in the spirit of the present invention are regarded as falling within the scope of the present invention.

What is claimed is:

1. A computer case comprising:
a chassis, the chassis including a base plate, an upper frame corresponding to the base plate, and two side frames connected to the base plate and the upper frame, each of the side frames forming an opening, the base plate including a hook plate bent inwardly adjacent to one side of the opening; and
at least one side plate, the at least one side plate being assembled to one of the two side frames and covering the opening, the at least one side plate including a guiding plate and a clasp member, the clasp member including a first extension section and a hook section bent from the first extension section, the first extension section extending from the guiding plate in an extending direction of the guiding plate, the clasp member being movable with respect to the hook plate and the hook section being engaged with the hook plate, thereby allowing the other end of the at least one side plate, opposite to the clasp member, to open to form an open angle with respect to the upper frame.

2. The computer case of claim 1, wherein the clasp member protrudes outwardly from an edge of the guiding plate, the base plate includes the hook plate disposed corresponding to the guiding plate and a recess formed on the hook plate, and a fastening portion is adjacent to the recess.

3. The computer case of claim 2, wherein the hook plate includes an upright section bent from the base plate and a second extension section connected to the upright section.

4. The computer case of claim 3, wherein the at least one side plate further includes an overlapping section bent from and parallel to the side plate, and the guiding plate protrudes outwardly from the overlapping section.

5. The computer case of claim 3, wherein the first extension section is corresponding in shape to the second extension section, and the first extension section and the second extension section are in a curved shape.

6. The computer case of claim 3, wherein when the at least one side plate is assembled to one of the side frames and covers the opening, the hook section of the clasp member is engaged with the second extension section, thereby preventing the side plate from opening to form the open angle.

7. The computer case of claim 3, wherein when the clasp member of the at least one side plate moves along the hook plate to the recess, the hook section of the clasp member is movably engaged with the fastening portion, thereby allowing the side plate to open to form the open angle.

8. The computer case of claim 3, wherein the open angle is formed by a moving distance between an outer edge of the second extension section and the fastening portion.

9. The computer case of claim 2, wherein the guiding plate includes two clasp members, and the hook plate includes two fastening portions for engagement with the clasp member.

10. A computer case, comprising:
a chassis, the chassis including a base plate, an upper frame corresponding to the base plate, and two side frames connected to the base plate and the upper frame, each of the side frames forming an opening, the base plate including a hook plate bent inwardly adjacent to one side of the opening, a fastening portion being disposed on the hook plate; and
at least one side plate assembled to one of the two side frames and covering the opening, the at least one side plate including a guiding plate a clasp member, the clasp member including a first extension section and a hook section bent from the first extension section, the first extension section extending from an edge of the guiding plate in an extending direction of the guiding plate, the clasp member being movable a guiding distance along the hook plate for engagement with the fastening portion, thereby allowing the other end of the at least one side plate, opposite to the clasp member, to open to form an open angle with respect to the upper frame.

11. The computer case of claim 10, wherein the chassis further includes a front plate and a rear frame opposite to the front plate, and when the at least one side plate moves a guiding distance in a direction from the front plate to the rear frame, the clasp member is engaged with fastening portion, thereby allowing the side plate to open to form the open angle.

12. The computer case of claim 11, wherein when the at least one side plate moves a guiding distance in a direction from the rear frame to the front plate, the clasp member is detached from the fastening portion to be moved along the hook plate to cover the opening and prevent the side plate from opening to form the open angle.

13. The computer case of claim 10, wherein the guiding plate extends corresponding to the hook plate, the hook plate forms a recess, and the fastening portion is disposed on the recess of the hook plate.

14. The computer case of claim 13, wherein the hook plate includes an upright section bent from the base plate and a second extension section connected to the upright section.

15. The computer case of claim 14, wherein the first extension section is corresponding in shape to the second extension section, and the first extension section and the second extension section are in a curved shape.

16. The computer case of claim 14, wherein the open angle is formed by a moving distance between an outer edge of the second extension section and the fastening portion.

17. The computer case of claim 10, wherein the at least one side plate further includes an overlapping section bent from and parallel to the side plate, and the guide plate protrudes outwardly from the overlapping section.

18. A computer case comprising:
a chassis, the chassis including a base plate, an upper frame corresponding to the base plate, and two side frames connected to the base plate and the upper frame, each of the side frames forming an opening, the base plate including a hook plate bent inwardly adjacent to one side of the opening; and
at least one side plate, the at least one side plate being assembled to one of the two side frames and covering the opening, the at least one side plate including a clasp member disposed protrudingly, the clasp member being movable with respect to the hook plate and engaged with the hook plate, thereby allowing the other end of the at least one side plate, opposite to the clasp member, to open to form an open angle with respect to the upper frame,
wherein the at least one side plate further includes a guiding plate, the clasp member protrudes outwardly from an edge of the guiding plate, the base plate includes a hook plate disposed corresponding to the guiding plate and a recess formed on the hook plate, and a fastening portion is adjacent to the recess, and
wherein the clasp member further includes a first extension section and a hook section bent from the first extension section, and the hook plate includes an upright section bent from the base plate and a second extension section connected to the upright section.

* * * * *